United States Patent
Pettersson

(10) Patent No.: US 12,139,043 B2
(45) Date of Patent: Nov. 12, 2024

(54) REGENERATIVE BRAKING DURING COMMUNICATION INTERRUPTIONS

(71) Applicant: Ford Global Technologies, LLC, Dearborn, MI (US)

(72) Inventor: Lars Niklas Pettersson, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 970 days.

(21) Appl. No.: 17/152,126

(22) Filed: Jan. 19, 2021

(65) Prior Publication Data

US 2022/0227232 A1    Jul. 21, 2022

(51) Int. Cl.
*B60L 7/10* (2006.01)
*B60L 3/00* (2019.01)
*B60L 7/26* (2006.01)

(52) U.S. Cl.
CPC ............... *B60L 7/10* (2013.01); *B60L 3/0076* (2013.01); *B60L 7/26* (2013.01); *B60L 3/0084* (2013.01); *B60L 2240/423* (2013.01)

(58) Field of Classification Search
CPC .. B60L 7/10; B60L 3/0076; B60L 7/26; B60L 3/0084; B60L 2240/423
USPC ........................................................ 700/22
See application file for complete search history.

(56) References Cited

U.S. PATENT DOCUMENTS

| | | | | |
|---|---|---|---|---|
| 5,322,352 A | * | 6/1994 | Ohno | B60L 7/22 303/3 |
| 6,086,166 A | * | 7/2000 | Fukasawa | B60T 8/17636 303/122.04 |
| 9,067,500 B2 | | 6/2015 | Penev | |
| 9,919,607 B2 | | 3/2018 | Ponziani | |
| 10,723,229 B1 | * | 7/2020 | Yao | B60L 7/10 |
| 2016/0325738 A1 | * | 11/2016 | Miyazaki | B60L 58/20 |
| 2018/0244157 A1 | * | 8/2018 | Hirakawa | B60L 7/10 |

FOREIGN PATENT DOCUMENTS

CN   100588565 C   2/2010

* cited by examiner

*Primary Examiner* — Jacob S. Scott
*Assistant Examiner* — Michael E Butler
(74) *Attorney, Agent, or Firm* — David B. Kelley; Brooks Kushman P.C.

(57) ABSTRACT

A braking control system includes a regenerative brake controller, a friction brake controller, and a master controller. The regenerative brake controller, in response to absence of expected communication between the master controller and regenerative brake controller, decreases regenerative braking. The master controller, in response to detecting the decrease in regenerative braking, commands the friction brake controller to increase friction braking.

16 Claims, 4 Drawing Sheets

REGENERATIVE BRAKING DURING COMMUNICATION INTERRUPTIONS

TECHNICAL FIELD

The present disclosure relates to the control of braking systems for automotive vehicles.

BACKGROUND

One pedal drive may give more control to the accelerator pedal with increased lift pedal regenerative braking and the ability to bring the vehicle to a stop without input from the brake pedal.

SUMMARY

One embodiment is a vehicle comprising an accelerator pedal. The accelerator pedal is configured to provide an overall torque request based at least in part on a three on the accelerator pedal to a master controller. The master controller is configured to calculate a regenerative torque request to supply to a regenerative braking controller programmed to in response to an issue with a first link test between the master controller and the regenerative braking controller, reduce a regenerative braking ratio based on a first regenerative braking ramping schedule. The master controller is further configured to calculate a friction torque request to supply to a friction braking controller, such that the overall torque request is fulfilled by at least one of the regenerative braking system and the friction braking system.

A second embodiment is a vehicle comprising an accelerator pedal. The accelerator pedal is configured to provide an overall torque request based at least in part on a force on the accelerator pedal to a master controller configured to calculate a regenerative torque request to supply to a regenerative braking controller. The master controller is further configured to calculate a friction torque request to supply to a friction braking controller programmed to in response to the failure of a first link test between the master controller and the friction braking controller, increase a friction braking value to fulfill the entirely of the overall torque request, such that the overall torque request is fulfilled by at least one of the regenerative braking system and the friction braking system.

A third embodiment is a vehicle comprising an accelerator pedal. The accelerator pedal is configured to provide an overall torque request based at least in part on a force on the accelerator pedal to a master controller configured to calculate a regenerative torque request to supply to a regenerative braking controller programmed to in response to an issue with a first link test between the master controller and the regenerative braking controller, reduce a regenerative braking ratio based on a first regenerative braking ramping schedule. The master controller is further configured to calculate a friction torque request to supply to a friction braking controller programmed to in response to the failure of a second link test between the master controller and the friction braking controller, increase a friction braking value to fulfill the entirety of the overall torque request, such that the overall torque request is fulfilled by at least one of the regenerative braking system and the friction braking system.

Figure 1:
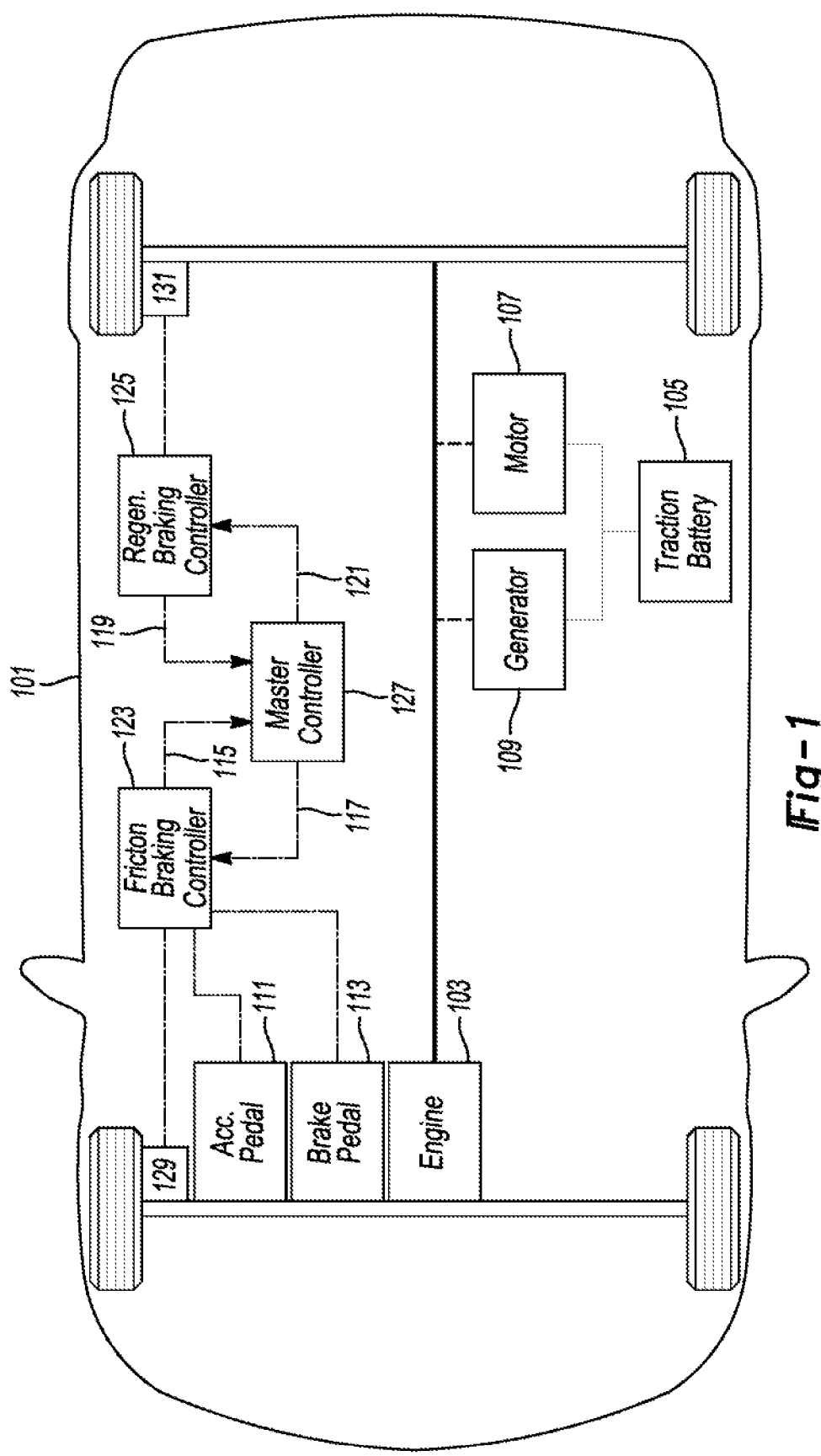
FIG. 1 is a schematic diagram of a vehicle.

DETAILED DESCRIPTION the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Brake by wire in a vehicle having both regenerative and friction braking may employ a plurality of controllers to calculate, monitor, and command braking of both systems. In a system having one pedal drive, some of the commands may be generated by removing force from the accelerator pedal. If a command for braking torque is requested by the driver, and one or more of the systems is not communicating as expected, the vehicle may need a strategy to slow the vehicle.

Generally speaking, a vehicle may use an electric power source for propulsion. For example, the vehicle may include a traction battery used for propulsion of the vehicle. Additionally, the vehicle may be partially propelled by an internal combustion power source such as an internal combustion engine. In embodiments containing both electrical and internal combustion power sources, the internal combustion power source may be in electrical communication with the electrical power source, such that power generated by the internal combustion power source may be used to charge the electrical power source. In such embodiments, the internal combustion power source may use electrical power components to facilitate conversion of combustion power to electrical power. For example, the internal combustion power source may be in mechanical communication with a generator. The generator may be in electrical communication with the electrical power source. In this configuration, the internal combustion power source may use combustion to operate the generator, thus charging the electrical power source. The vehicle may comprise other electrical power components. For example, the vehicle may comprise an additional electric machine. This electric machine may be configured to add negative torque to the vehicle during operation.

The vehicle may have an accelerator pedal. The accelerator pedal may be configured to control vehicle propulsion. To facilitate control of propulsion, the accelerator pedal may be configured such that pressing the pedal may request positive torque from a power source within the vehicle causing the vehicle to increase speed. Additionally, the accelerator pedal may be configured such that releasing the pedal may request negative torque with respect to the direction of vehicle motion, thus causing the vehicle to decrease in speed. The accelerator pedal may request negative torque from an electric machine, an electric power source, an internal combustion engine, regenerative braking, friction braking, and other sources of negative torque.

The vehicle may have a brake pedal. Similar to the accelerator pedal, the brake pedal may be configured to control vehicle propulsion. To facilitate control of propulsion, the brake pedal may be configured such that pressing the pedal may request negative torque from a torque source within the vehicle causing the vehicle to decrease speed. For example, the brake pedal may request negative torque from an electric power source, an internal combustion engine, regenerative braking, friction braking, and other sources of negative torque. The brake pedal may be used to reset one of a friction braking controller, master controller, and regenerative braking controller. For example, the brake pedal may be configured such that upon depression of a reset threshold, the brake pedal sends a signal to the friction brake controller to try and reset or restart the controller.

The vehicle may comprise a regenerative braking system. The regenerative braking system may be disposed within the wheels of the vehicle. The regenerative braking system may be in one of electromagnetic and mechanical communication with the wheels. In embodiments wherein the regenerative braking system is in electromagnetic communication with one of the drivetrain and the wheels, the regenerative braking system may use magnetic resistance to provide negative torque to the wheels, such that the vehicle speed may be decreased by the regenerative braking system. Additionally, the regenerative braking system may use energy collected from the inertia of the vehicle to generate electrical power. Further, the regenerative braking system may be in electrical communication with an electrical power source and configured to provide electrical power to said electrical power source. For example, the regenerative braking system may be used to charge a vehicle battery. The regenerative braking system may include electrical power components to facilitate the transfer of inertial energy into electrical power configured for the electrical power source. For example, the regenerative braking system may use a generator to convert inertia into electrical power.

The vehicle may comprise a friction braking system. The friction braking system may be disposed within the wheels of the vehicle. The friction braking system may be selectively in physical communication with the wheels such that in a first friction braking position, the friction braking system may provide a first friction coefficient to the wheels, and in a second friction braking position, provide a second friction coefficient to the wheels. The first friction braking coefficient may be zero. The second friction braking coefficient may work to provide negative torque to the wheels with respect to motion of the vehicle. The friction braking system may operate by increasing and decreasing pressure in the friction braking system. For example, increasing the pressure may increase friction between the friction brakes and the vehicle, thus providing negative torque to the vehicle.

The vehicle may have a drivetrain. The drivetrain may be in at least one of electrical, magnetic, and mechanical communication with at least one of an internal combustion engine, an electric power source, and a regenerative braking system. In some embodiments, the drivetrain may be in fluid communication with the internal combustion engine. For example, the vehicle may have a torque converter between the drivetrain and the internal combustion engine.

The vehicle may have a propulsion braking system. The propulsion braking system may be in mechanical communication with the drivetrain. Hence, the propulsion braking system may be in one of electrical, magnetic, mechanical, and fluid communication with at least one of the internal combustion engine, electric power source, and regenerative braking system. As such, the propulsion braking system may receive inertial resistance from one of the internal combustion engine, electric power source, and regenerative braking system.

The vehicle may have a master controller. The controller may be in electrical communication with at least one of the regenerative braking system, the friction braking system, the electrical power source, the mechanical power source, the drivetrain, and the accelerator pedal. As such, the controller may be able to control operations of these devices. For example, the controller may be able to actuate the friction braking system. Similarly, the controller may be able to actuate the regenerative braking system. Further, the controller may be configured to operate an electrical machine capable of providing negative torque to the vehicle.

The master controller may comprise a timer. The timer may be used to determine the amount time a vehicle its at or below a second speed threshold. For example, the controller may use the timer to observe that a vehicle has been at 0 mph (standstill) for at least 10 seconds. The controller may comprise a temporal value schedule.

The master controller may comprise a brake ramp schedule. The brake ramp schedule may be used to determine the rate of torque application and release from the friction brake. Similarly, the brake ramp schedule may be used to determine the rate of torque application and release from other braking sources. The brake ramp schedule may contain entries indicative of predetermined torque values. The brake ramp schedule may contain entries for both the friction braking system and the regenerative braking system.

The vehicle may comprise a friction braking controller. The friction braking controller may be in communication with the master controller. The friction braking controller may be configured to selectively operate the friction braking system. The friction braking controller may operate the friction braking system by increasing and decreasing the pressure within the friction braking system.

The vehicle may comprise a regenerative braking controller. The regenerative braking controller may be in communication with the master controller. The regenerative braking controller may be configured to selectively operate the regenerative braking system. The regenerative braking controller may operate the regenerative system by operating an electric machine. In some embodiments, the electric machine includes an inverter. The vehicle may comprise a plurality of inverters. In such embodiments, the regenerative braking controller may operate at least one of the inverters with a priority for a master inverter.

One of a master controller, regenerative braking controller, and the friction braking controller may monitor the regenerative braking to friction braking ratio. For example, the master controller may determine that the regenerative braking to friction braking ratio is 8:2 (or 4), such that 80% of the braking is regenerative and 20% of the braking is friction. The ratio may be altered by decreasing one of the friction. and regenerative braking values. For example, if the initial braking values are 80 NM regenerative and 20 Nm friction but become 60 NM regenerative and 20 Nm Diction, the ratio has decreased from 8:2 (or 4) to 6:2 (or 3). Further, if the initial braking values are 80 Nm regenerative and 20 Nm friction, but become 80 NM regenerative Nm friction, the ratio has decreased from 8:2 (or 4) to 8:8 (or 1).

The regenerative braking controller may be programed to reduce a regenerative braking ratio. The regenerative braking controller may be programed to reduce a regenerative braking ratio in response to an issue with a first link test between the master controller and the regenerative braking controller (lack of communication). Alternatively, the regenerative braking controller may be programed to reduce a regenerative braking ratio in response to a lack of communication between the master controller and the regenerative braking controller. The first link test may comprise a first transmission signal transmitted from the master controller to the regenerative braking controller. The first link test may be determined to be successful upon reception of the first transmission signal by the regenerative braking controller from the master controller. The first link test may be determined to be a failure upon the lack of reception of the first transmission signal by the regenerative braking controller from the master controller in a predetermined time value. The first link test may further comprise a plurality of sequential segments separated by the predetermined test time value. The regenerative braking controller may wait until the issue with a sequential segment subsequent to the first segment appears. The regenerative braking controller may be programmed to reduce a regenerative braking value. The reduction of the regenerative braking value or braking ratio may follow a first ramp rate. The ramp rate may be defined by a ramp time and a ramp force. The regenerative braking controller may reduce the regenerative braking value or ratio to 0. As such, the entirety of the overall torque request may be fulfilled by the friction braking system.

The regenerative brake controller may be programmed to reduce a regenerative braking ratio based on a second regenerative braking ramp schedule. The regenerative brake controller may be programmed to reduce a regenerative braking ratio based on a second regenerative braking ramp schedule in response to an issue with a second link test between the friction brake controller and. the vehicle controller. The second link test may comprise a second transmission signal transmitted from the regenerative braking controller to the master controller. The first link test may be determined to be successful upon reception of the second transmission signal by the master controller from the friction braking controller. The second regenerative braking ramp schedule may be −1 Nm/s.

The friction braking controller may be programmed to increase a friction braking value. The friction braking controller may be programmed to increase the friction braking value in response to a third link test between the master controller and the friction braking controller. Alternatively, the friction braking controller may be programmed to increase the friction braking value in response to a lack of communication between the master controller and the friction braking controller. The third link test may comprise a third transmission signal transmitted from the master controller to the friction braking controller. The third link test may be determined to be successful upon reception of the third transmission signal by the friction braking controller from the master controller. The third link test may be determined to be an issue upon the lack of reception of the third transmission signal by the friction braking controller from the master controller in a predetermined time value. The third link test may further comprise a plurality of sequential segments separated by the predetermined test time value. The friction braking controller may be further programmed to, in response to an issue with a first segment of the third link test and before the expiration of the predetermined test time value, maintain the friction braking value. Maintenance of the friction braking value may include maintaining current pressure in the pressurized friction braking system. After the failure of the third link test, the friction braking system may fulfill the entirety of the overall torque request. The friction braking controller may be configured to modify the friction braking value based in part on a friction braking ramp schedule.

The friction braking controller may be programmed to increase the friction braking value in response to a fourth link test between the master controller and the regenerative braking controller. Alternatively, the friction braking controller may be programmed to increase the friction braking value in response to a lack of communication between the master controller and the regenerative braking controller. The fourth link test may comprise a fourth transmission signal transmitted from the regenerative braking controller to the master controller. The fourth link test may be determined to be successful upon reception of the fourth transmission signal by the master controller from the regenerative braking controller.

The master controller may be programmed to provide a set of default values to one of the friction braking controller and the regenerative braking controller. The master controller may be programmed to provide a first set of default values to the friction braking controller in response to the second link test between the friction braking controller and the master controller. The first set of default values may serve as a signal requesting the friction braking system to fulfill the entirety of any subsequent overall torque request. The master controller may be programmed to provide a second set of default values to the friction braking controller in response to the fourth link test between the regenerative braking controller and the master controller. The second set of default values may serve as a signal requesting the regenerative braking system to stop providing torque, such that it provides none of the torque required to fulfill subsequent overall torque requests. In some embodiments, the master controller may request the regenerative braking system to provide the entirety of torque for subsequent overall torque requests.

FIG. 1 depicts a hybrid vehicle 101. The hybrid vehicle 101 comprises an engine 103, a traction battery 105, a motor 107, a generator 109, an accelerator pedal 111, and a brake pedal 113. The engine 103 is in mechanical communication with the motor 107 and the generator 109. Both the motor 107 and the generator 109 are in communication with a friction braking controller 123. The friction braking controller 123 is further in communication with a master controller 127 via a first electrical bus 115 and a second electrical bus 117. The first electrical bus 115 is configured to transmit signals from the friction braking controller 123 to the master controller 127. Similarly, the second electrical bus 117 is configured to transmit signals from the master controller 127 to the friction braking controller 123. The master controller 127 is further in communication with a regenerative braking controller 125 via a third electrical bus 119 and a fourth electrical bus 121. The third electrical bus 119 is configured to transmit signals from the regenerative braking controller 125 to the master controller 127. The fourth electrical bus 121 is configured to transmit signals from the master controller 127 to the regenerative braking controller 125. The hybrid vehicle 101 further comprises a friction braking system 129 selectively controllable by the friction braking controller 123, as well as a regenerative braking system 131, which includes the generator 109, selectively controllable by the regenerative braking controller 125.

Controllers/interfaces/modules in the hybrid vehicle 101 may communicate via one or more vehicle networks. The vehicle network may include a plurality of channels for communication. One channel may be a serial bus such as a CAN. Another channel may include an Ethernet network defined by the Institute of Electrical and Electronics Engineers 802 family of standards. Additional channels may include discrete connections between modules and may include power signals from an auxiliary battery. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network may connect to any electronic module that is present in the hybrid vehicle 101 or remote from the hybrid vehicle 101 via a transceiver.

Figure 2:
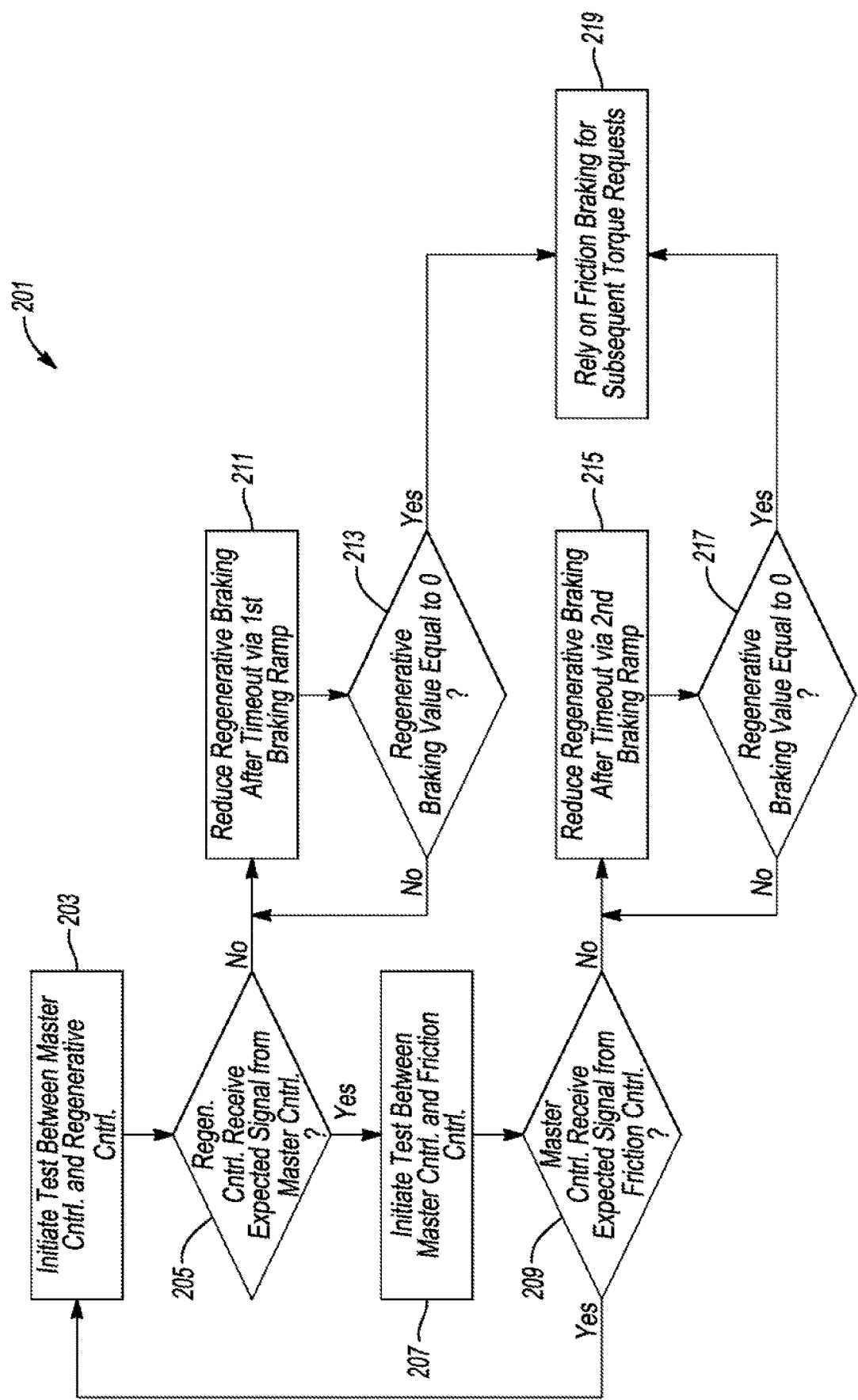
FIG. 2 is a flow chart of a regenerative braking controller algorithm.

FIG. 2 depicts a regenerative braking controller algorithm 201. The regenerative braking controller algorithm 201 begins with a first test initiation step 203, which starts a first test between the master controller 127 and the regenerative braking controller 125. Next the regenerative braking controller algorithm 201 moves to a first test evaluation step 205 to determine if a signal sent from the master controller 127 has reached the regenerative braking controller 125.

If the first test is unsuccessful, the regenerative braking controller algorithm 201 will move to a first timeout step 211, in which after a first predetermined time period, the regenerative braking controller 125 will reduce regenerative braking. Next, the regenerative braking controller algorithm 201 will move to a first regenerative braking evaluation step 213 to determine if the regenerative braking value is 0. If not, the regenerative braking controller algorithm 201 will return to the first timeout step 211 to reduce the regenerative braking again. The regenerative braking controller algorithm 201 may not need to wait another timeout value. After the regenerative braking reaches 0, the regenerative braking controller algorithm 201 will move to a hold step 219, and rely completely on fiction braking for subsequent torque requests.

If the first test is successful, the regenerative braking controller algorithm 201 will move to a second test initiation step 207, in which the friction braking controller 123 will send a signal to the master controller 127. Next in a second test evaluation step 209, the regenerative braking controller algorithm 201 will evaluate the status of the test. If the second test is unsuccessful, the regenerative braking controller algorithm 201 will move to a second timeout step 215, in which after a predetermined time period, the regenerative braking controller 125 will reduce regenerative braking. Next the regenerative braking controller algorithm 201 will move to a second regenerative braking evaluation step 217 to determine if the regenerative braking value is 0. If not, the regenerative braking controller algorithm 201 will return to the second timeout step 215 to reduce the regenerative braking again. The regenerative braking controller algorithm 201 may not need to wait an additional timeout value. After the regenerative braking reaches 0, the regenerative braking controller algorithm 201 will move to a hold step 219 and rely completely on friction braking for subsequent torque requests. If the second test is successful, the regenerative braking controller algorithm 201 will move back to the first test initiation step 203.

Figure 3:
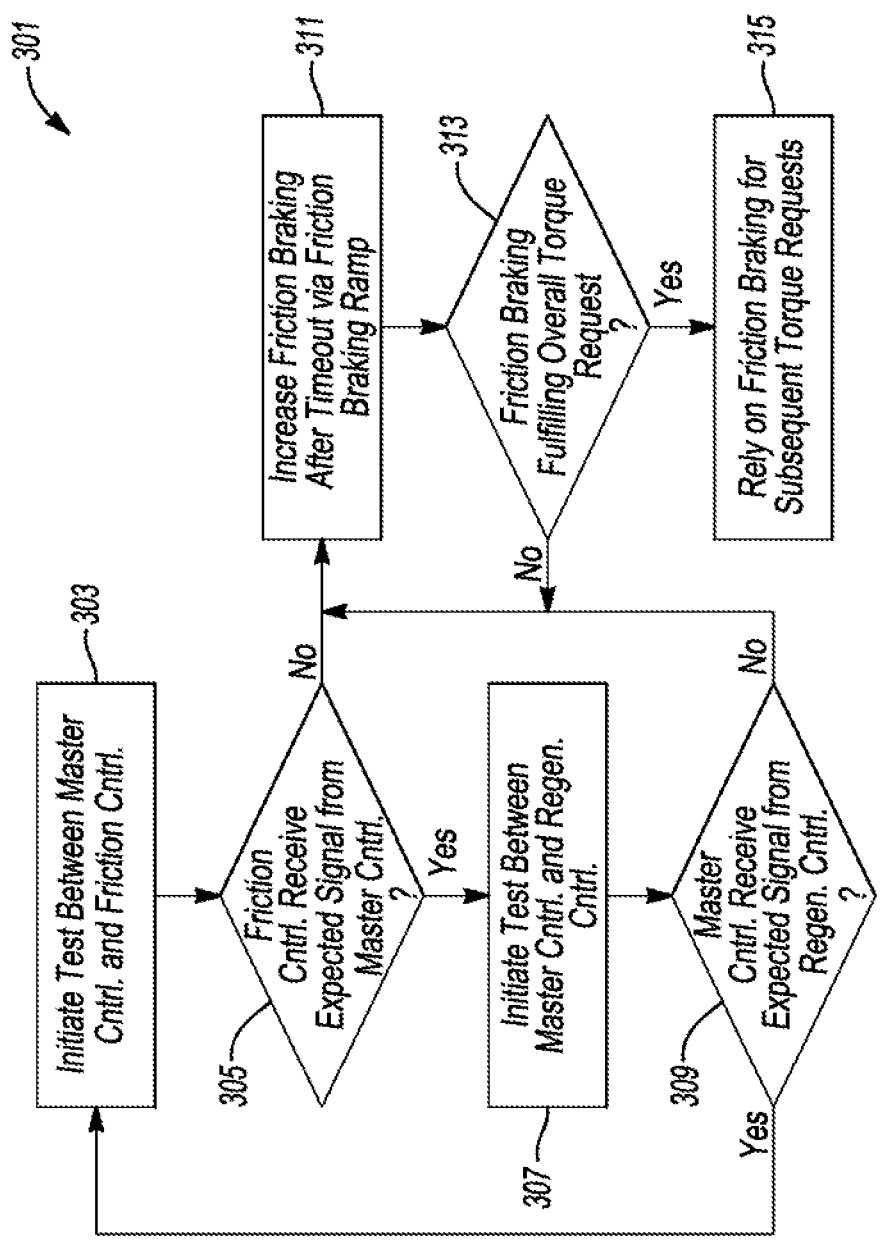
FIG. 3 is a flow chart of a friction braking controller algorithm.

FIG. 3 depicts a friction braking controller algorithm 301. The friction braking controller algorithm 301 begins with a first test initiation step 303 which comprises sending a signal from the master controller 127 to the friction braking controller 123. Next, the friction braking controller algorithm 301 will move to a first test evaluation step 305 to determine if the signal sent from the master controller 127 was received by the friction braking controller 123. If the signal was received, the friction, braking controller algorithm 301 will move to a second test initiation step 307 in which the regenerative braking controller 125 will send a signal to the master controller 127. If the master controller 127 received the signal from the regenerative braking controller 125, the friction braking controller algorithm 301 will return to the first test initiation step 303. If either the first test evaluation step 305 or the second test evaluation step 309 fails, the friction braking controller algorithm 301 will move to a timeout step 311, in which after a predetermined timeout period, the friction braking controller 123 will increase the value of friction braking. Next in a friction torque evaluation step 313, the friction braking controller algorithm 301 will determine if the friction braking system is producing enough torque to fulfill the overall torque request. If not, the friction braking controller algorithm 301 will return to the timeout step 311 to further increase friction braking. The friction braking controller algorithm 301 may not need to wait an additional timeout period to increase friction braking. If the friction braking system is producing enough torque to fulfill the overall torque request, the friction braking controller algorithm 301 will move to a hold step 315, in which it the friction braking controller algorithm 301 will rely upon friction braking to fulfill subsequent torque requests.

Figure 4:
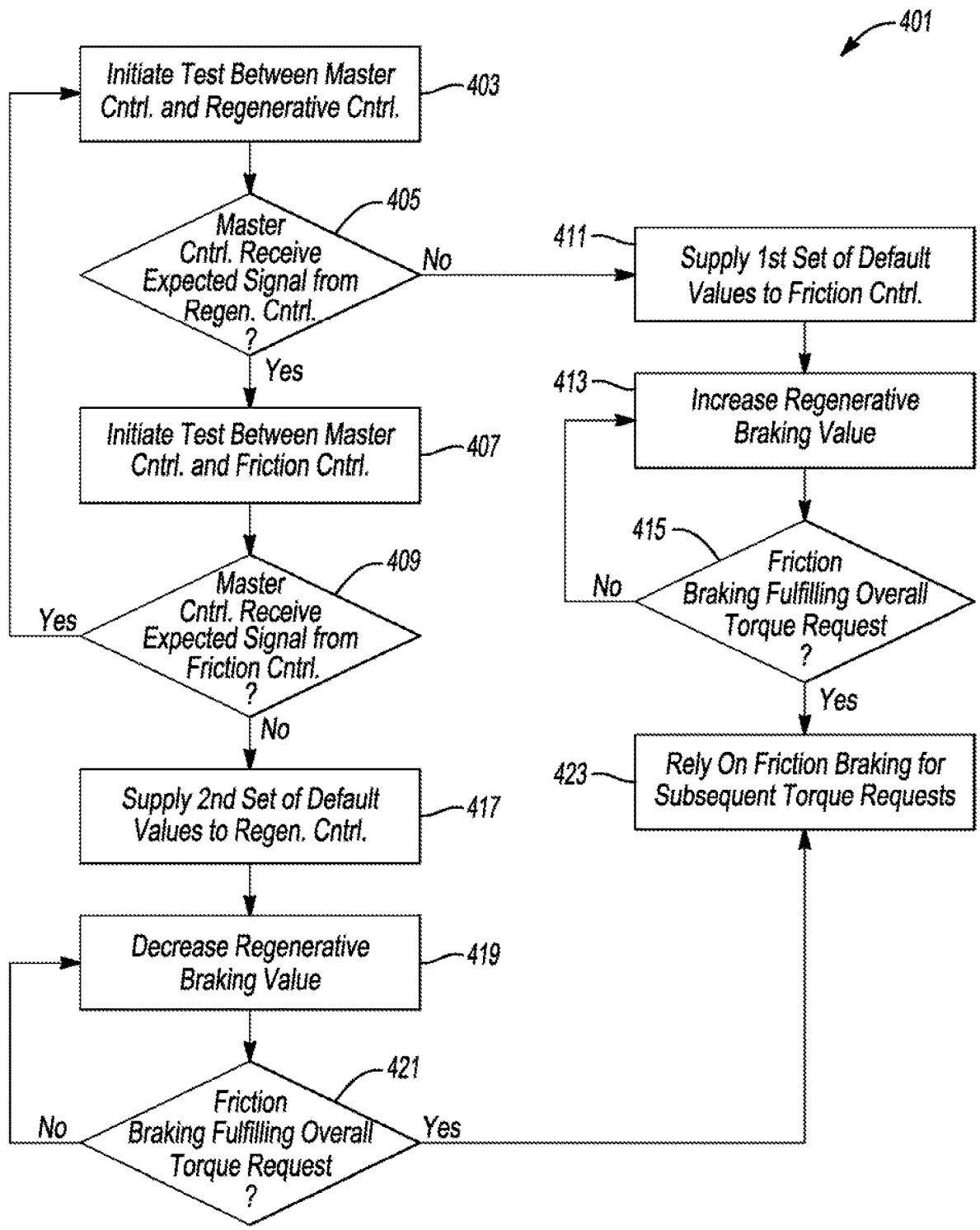
FIG. 4 is a flow chart of a master controller algorithm.

FIG. 4 depicts a master controller algorithm 401. The master controller algorithm 401 begins with a first test initiation step 403, which starts a first test between the master controller 127 and the regenerative braking controller 125. Next the master controller algorithm 401 moves to a first test evaluation step 405 to determine if a signal sent from the master controller 127 has reached the regenerative braking controller 125.

If the first test fails, the master controller algorithm 401 will move to a supply a first default set step 411, in which after a first predetermined time period, the master controller 127 will supply a first set of default values to the friction controller. Next, the master controller algorithm 401 will move to an increase friction step 413 wherein the friction braking controller 123 will increase the friction braking value. in the subsequent first friction evaluation step 415, the master controller algorithm 401 will determine if the friction braking system is fulfilling the overall torque request. If not, the master controller algorithm 401 will return to the increase friction step 413. if the friction braking system is fulfilling the overall torque request, the master controller algorithm 401 will move to a hold step 423, in which the master controller algorithm 401 will rely upon friction braking to fulfill subsequent overall torque requests.

If the first test succeeds, the master controller algorithm 401 will move to a second test initiation step 407 in which the friction controller 123 will send a signal to the master controller 127. If the test succeeds, the master controller algorithm 401 will move back to the first test initiation step 403. If the test is unsuccessful, the master controller will move to supply a second default set step 417, in which the master controller will supply a second set of default values to the regenerative braking controller 125. Next, the master controller algorithm 401 will move to a decrease regenerative braking step 419, in which the master controller algorithm 401 will decrease a regenerative braking value. In the subsequent second friction evaluation step 421, the master controller algorithm 401 will determine if the friction braking is fulfilling the overall torque request. Alternatively, the master controller algorithm 401 will determine if the regenerative braking value is 0. If not, the master controller algorithm 401 will return to the decrease regenerative braking step 419, and further decrease regenerative braking. If the friction braking system is fulfilling the overall torque request, the master controller algorithm 401 will move to a hold step 423, in which the master controller algorithm 401 will rely upon friction braking to subsequent overall torque requests.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited, to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A braking control system comprising:
a regenerative brake controller;
a friction brake controller; and
a master controller programmed to generate a regenerative torque request for the regenerative brake controller and a friction torque request for the friction brake controller, wherein the regenerative brake controller is programmed to, in response to absence of expected communication between the master controller and regenerative brake controller, decrease regenerative braking, wherein the master controller is further programmed to, in response to detecting the decrease in regenerative braking, command the friction brake controller to increase friction braking, and wherein the friction brake controller is further programmed to, in response to absence of expected communication between the master controller and friction brake controller, increase friction braking.

2. The braking control system of claim 1, wherein the friction brake controller is further programmed to increase friction braking according to a ramp schedule.

3. The braking control system of claim 1, wherein the master controller is further programmed to, in response to detecting the increase in friction braking, command the regenerative brake controller to decrease regenerative braking.

4. The braking control system of claim 1, wherein the regenerative brake controller is further programmed to decrease the regenerative braking to zero within a predetermined time.

5. The braking control system of claim 1, wherein the regenerative brake controller is further programmed to decrease regenerative braking according to a ramp schedule.

6. A method comprising:
during an absence of expected communication between a master controller and a regenerative brake controller, decreasing by the regenerative brake controller regenerative braking and increasing by a friction brake controller friction braking such that a request for braking is satisfied by a combination of the regenerative braking and friction braking.

7. The method of claim 6 further comprising, during an absence of expected communication between the master controller and friction brake controller, increasing by the friction brake controller friction braking.

8. The method of claim 7, wherein the friction braking is increased according to a ramp schedule.

9. The method of claim 7 further comprising, in response to the increasing by the friction brake controller friction braking, decreasing by the regenerative brake controller regenerative braking.

10. The method of claim 6, wherein the regenerative braking is decreased to zero within a predetermined time.

11. The method of claim 6, wherein the regenerative braking is decreased according to a ramp schedule.

12. A vehicle comprising:
an electric machine;
friction brakes; and
a controller arrangement including a master controller, a regenerative brake controller, and a friction brake controller, wherein the friction brake controller is programmed to, during an absence of expected communication between the master controller and friction brake controller, increase braking via the friction brakes, and wherein the master controller is programmed to, in a presence of the increase in braking via the friction brakes, command the regenerative brake controller to decrease braking via the electric machine.

13. The vehicle of claim 12, wherein the friction brake controller is further programmed to increase braking via the friction brakes according to a ramp schedule.

14. The vehicle of claim 12, wherein the regenerative brake controller is further programmed to, during an absence of expected communication between the master controller and regenerative brake controller, decrease braking via the electric machine.

15. The vehicle of claim 14, wherein the regenerative brake controller is further programmed to decrease the braking via the electric machine to zero within a predetermined time.

16. The vehicle of claim 14, wherein the regenerative brake controller is further programmed to decrease the braking via the electric machine according to a ramp schedule.

* * * * *